United States Patent [19]
Ueno et al.

[11] 4,342,789
[45] Aug. 3, 1982

[54] **PROCESS FOR INHIBITING GROWTH OF *CLOSTRIDIUM BOTULINUM* AND FORMATION OF NITROSAMINES IN MEAT**

[75] Inventors: Ryuzo Ueno, Nishinomiya; Toshio Matsuda, Itami; Shigeo Inamine, Kobe; Tatsuo Kanayama, Takarazuka; Yatsuka Fujita, Nishinomiya, all of Japan

[73] Assignee: Kabushiki Kaisha Ueno Seiyaku Oyo Kenkyujo, Osaka, Japan

[21] Appl. No.: 165,077

[22] Filed: Jul. 1, 1980

[30] Foreign Application Priority Data

Sep. 7, 1979 [JP] Japan .................................. 54-114110
Jun. 5, 1980 [JP] Japan .................................. 55-74983

[51] Int. Cl.$^3$ ............................ A23B 4/02; A23B 4/14
[52] U.S. Cl. ..................................... 426/266; 426/281; 426/332; 426/335; 426/641; 426/646; 426/652
[58] Field of Search ............... 426/264, 265, 266, 332, 426/335, 641, 646, 652, 281

[56] References Cited

U.S. PATENT DOCUMENTS

| | | | |
|---|---|---|---|
| 2,180,750 | 11/1939 | Urbain | 426/266 X |
| 3,122,442 | 2/1964 | Sair | 426/266 X |
| 3,258,348 | 6/1966 | Schack et al. | 426/266 |
| 3,386,836 | 6/1968 | Borenstein et al. | 426/265 X |
| 3,515,561 | 6/1970 | Flesch et al. | 426/265 |
| 3,716,381 | 2/1973 | Ueno et al. | 426/332 |
| 3,851,077 | 11/1974 | Stemmler et al. | 426/265 |
| 3,899,600 | 8/1975 | Sweet | 426/266 X |
| 3,966,974 | 6/1976 | Bharucha et al. | 426/266 X |
| 4,079,153 | 3/1978 | Coleman | 426/641 X |
| 4,146,651 | 3/1979 | Bharucha et al. | 426/265 |

FOREIGN PATENT DOCUMENTS

| | | | |
|---|---|---|---|
| 1098341 | 1/1961 | Fed. Rep. of Germany | 426/266 |
| 2713259 | 9/1977 | Fed. Rep. of Germany | 426/264 |
| 1245227 | 9/1971 | United Kingdom | 426/265 |

OTHER PUBLICATIONS

Fiddler et al., "Inhibition of Formation of Volatile Nitrosamines in Fried Bacon by the Use of Cure-Solubilized X-Tocopherol", *J. Agric. Food Chem.*, vol. 6, No. 3, 1978, pp. 653–656.

Furia, *CRC Handbook of Food Additives*, 1968, p. 359, Gp. 170.

Ivey et al. (I), *Journal of Food Protection*, vol. 41, No. 8, pp. 621–625, 8/1978.

*Primary Examiner*—Arthur L. Corbin
*Attorney, Agent, or Firm*—Sherman & Shalloway

[57] ABSTRACT

A process for inhibiting growth of *Clostridium botulinum* and formation of nitrosamines in pork which comprises separately adding to the pork (A) a liquid or powdery additive composition containing sorbic acid or potassium sorbate and optionally (A') a powdery or liquid additive composition containing at least one of such reducing agents as ascorbic acid or its salts, erythorbic acid or its salts, higher fatty acid esters of ascorbic acid and erythorbic acid, higher acetals of ascorbic acid and erythorbic acid and tocopherols, and (B) a liquid or powdery curing agent containing nitrite.

13 Claims, No Drawings

PROCESS FOR INHIBITING GROWTH OF *CLOSTRIDIUM BOTULINUM* AND FORMATION OF NITROSAMINES IN MEAT

BACKGROUND OF THE INVENTION

1. Field of the Invention

This invention relates to a process for producing nitrite cured ham and bacon which is not susceptible to contamination from *Clostridium botulinum*, and which will not produce carcinogenic products upon cooking.

2. Discussion of the Prior Art

Normally a nitrite salt is added to ham and bacon at a ratio of 120–156 ppm as $NaNO_2$, together with sodium chloride, for the purposes of (1) inhibiting growth of bacteria which cause food poisoning, particularly *Clostridium botulinum*, (2) stabilizing the color of meat, (3) imparting a favorable flavor to cured meat, and (4) retarding the spoilage of meat.

The usual means for adding the nitrite salt to the meat include, for example, sprinkling a powdery curing agent on the meat as it is, or injecting a pickle solution into the meat, or dipping the meat in the pickle solution.

Of the above activities of nitrite, the most important from the standpoint of food sanitation is the antibotulinal activity. If the nitrite is reduced or not used, the growth of *Clostridium botulinum* cannot be inhibited, and the deadly poison produced thereby will cause extremely dangerous food poisoning.

With the view to preventing reducing danger, the addition of a nitrite by 120–156 ppm as $NaNO_2$ as aforesaid is practiced in the United States, and this addition level is deemed to be absolutely necessary for achieving the intended purpose.

The use of nitrite represented by $NaNO_2$, however, has been found to give rise to the following problems. To wit, (1) formation of nitrosamines in the meat by the reaction of secondary amines or amino acids with nitrite is observed. Particularly in bacon the reaction of L-proline, an amino acid, with nitrite under the cooking heat produces N-nitrosopyrrolidine (NPYR). These nitrosamines are invariably strong carcinogens for animals. (2) Nitrite itself has been recently reported to be carcinogenic by Newbern et al. of MIT, and it is suspected that similar research results may be reported in the future. (3) Nitrite is extremely reactive. For example, its reaction with compounds containing double bonds, or its amino acid-decomposing reaction, or its reaction with hydroxyl group-containing compounds have been confirmed. The majority of the products of its reactions with such various organic compounds are mutagens.

Based on the foregoing facts, there is a possibility that people who eat nitrite-added ham and bacon may have a higher risk of cancer.

It is a vital necessity, therefore, to reduce the amount of nitrite radicals ($NO_2^-$) added for making safe meat products, such as ham and bacon, to start with.

The reduction in the amount of $NaNO_2$, however, makes it impossible to inhibit the growth of *Clostridium botulinum* as aforesaid, inviting a serious food sanitation problem.

Furthermore, addition of erythorbic acid and the salts thereof, ascorbic acid and the salts thereof, their higher fatty acid esters and their higher acetals, as well as tocopherols, to the meat has been attempted for the purpose of preventing the formation of nitrosamines.

Consequently, it became apparent that some other means had to be employed for reducing $NaNO_2$, inhibiting the formation of nitrosamines such as NPYR, and still inhibiting the growth of *Clostridium botulinum*. For example, utilization of sorbic acid or its salts as the preservative may be considered.

The reduction in $NaNO_2$ also impairs the stability of meat color. Hence it becomes necessary to add an enediol type reducing agent such as sodium erythorbate, in addition to the nitrosamine formation-inhibiting agents as aforesaid.

In the past it was attempted, therefore, to mix $NaNO_2$, sodium erythorbate (NaEry) and potassium sorbate (SoK) into a pickle solution concurrently, and inject the solution into a meat lump for making meat products, e.g., bacon.

When such a method is employed, however, the high reactivity of $NaNO_2$ with the various componds as aforesaid presents a very serious problem. For example, the reaction of $NaNO_2$ with sorbic acid has been confirmed by studies reported in the following publications.

Chemistry and Biology 17 361 (1978)
Arg. Biol. Chem., 39 1335 (1975)
Rev. Polarogr. 34 45 (1978)
Tetrahedron 34 505 (1978)
IARC Sci. Pub. No. 12 Screening Tests in Chemical Carcinogenesis 105–115
Mut. Res. 30 417 (1975)
Mut. Res. 53 206 (1978)

Furthermore, the formation of an ether-extractable, recassay positive substance by a reaction between $NaNO_2$ and sodium erythorbate at such high concentrations as used in the conventional pickle solutions has been recognized. Also when certain amino acids are reacted in the presence of $NaNO_2$ at a high concentration, they are completely decomposed. Hence, addition of mixed amino acids as condiments to the pickle solution must be avoided.

A reaction between $NaNO_2$ with tyrosine was reported in *J. Food Sci.*, 41, 585 (1976), and that with tryptophane to form nitrosotriptophane was reported in *Can. J. Biochem.*, 50, 1282 (1972).

SUMMARY OF THE INVENTION

This invention provides a method which essentially solves these problems, the problems being roughly classifiable into the following four types;

(1) effective inhibition of formation of nitrosamines in general, as well as NPYR,
(2) reduction of nitrite radicals remaining in the meat,
(3) powerful antibotulinal activity with the reduced nitrite radicals, and
(4) stabilization of favorable meat color.

Most importantly, all the reactions and decomposition among the nitrite radicals and other additives must be prevented. We successfully solved all of the above problems including the prevention of objectionable reactions, by adding the additives other than $NaNO_2$ entirely separately from the addition of $NaNO_2$. To wit, since there are possibilities of $NaNO_2$ reacting with sorbic acid or enediol type compounds, any contact between $NaNO_2$ with those compounds must be absolutely avoided, at least before they are added to the meat. Because, if the injection amount of a pickle solution is one-tenth the weight of meat as has been conventionally practiced, the concentration of the curing agent in the pickle solution is ten times that in the meat. At such high concentrations, the reactions of $NaNO_2$ with other additives are unavoidable.

Of course there are many additives to be used with ham and bacon, other than the above-named, such as tocopherols, and the fatty acid esters of ascorbic acid and erythorbic acid as the enediol type substances, and their higher acetals. In any case those compounds invariably cause reaction when they are concurrently present with $NaNO_2$ at such high concentrations as in a conventional pickle solution. It is only logical to inhibit the reaction and consequently the formation of reaction products.

DETAILED DESCRIPTION OF THE INVENTION

This invention provides these means for solving the above problems by a process which comprises:

(1) separate addition to the meat of (A) an additive composition including amino acid-type condiments, sorbic acid and the salts thereof or $C_8$–$C_{12}$ glycerol fatty acid esters which show antibacterial activities, erythorbic acid and the salts thereof, ascorbic acid and the salts thereof, and their higher fatty acid esters, their higher acetals or tocopherols and (B) a $NaNO_2$-containing additive, (2) when an organic acid or acids and/or acidic inorganic salt or salts are added to the above (A) additives, separate addition to the meat of such (A) additives and (B) a $NaNO_2$-containing curing agent, in order to increase the effect of the above-named preservative as well as to avoid their reactions with $NaNO_2$.

Examples of the organic acids for increasing the effect of sorbic acid and other preservatives include acetic acid, propionic acid, butyric acid, malic acid, succinic acid, tartaric acid, adipic acid, fumaric acid, citric acid, glucono-delta-lactone and phosphoric acid, etc. Also the useful acidic organic and inorganic acid salts include monosodium phosphate, monopotassium phosphate, monosodium fumarate and sodium hexametaphosphate.

If these acidic substances are concurrently present with $NaNO_2$, the nitrite tends to become unstable. For this reason only when they are added independently of the composition (B) containing the nitrite, can they be used in optional amounts necessary for producing safe ham and bacon, completely eliminating the decomposition of nitrite radicals. Furthermore, this separate addition of the acid enables the concurrent use of sodium erythorbate and a nitrite, accomplishing the reduction in the residual nitrite radicals and NPYR, as well as the inhibition of sodium erythorbate decomposition which forms still unidentified reaction products.

The additives (A), which should not come into contact with a nitrite before their addition to the meat, can be used either singly or in combination of two or more of the named specific substances.

For example, (1) sorbic acid as a component of the composition (A) may be added in powder form, or as a solution in an organic solvent, or as an aqueous suspension; (2) the aforesaid various acidic substances may be added to the above composition (A) to cause simultaneous addition; (3) a $C_8$–$C_{12}$ glycerol fatty acid ester may be further added to the composition in order to increase the preserving effect.

Or, the enediol compound used as a component of (A) can be added in the form of an aqueous solution or suspension, to which sorbic acid may be optionally added as in (1) above. An acidic substance or substances, or a $C_8$–$C_{12}$ glycerol fatty acid ester may also be added, or the composition may be simultaneously added with an acid. It is also an embodiment of this invention to replace the sorbic acid with potassium sorbate, or with a mixture of sorbic acid and potassium sorbate. The mixture may be used as an aqueous solution or an organic solvent solution or suspension.

The reduction in the use of sodium nitrite being one of the important objects of this invention, obviously the addition of sodium nitrite in an amount reduced by an optional degree from the presently employed levels of 120 ppm with bacon and 156 ppm with ham, is one of the embodiments of this invention.

Thus, for example, sorbic acid or its salt can be used in any form of an organic solvent solution, aqueous solution, special preparation, a sorbic acid-potassium sorbate mixture or their concurrent addition, and an aqueous suspension.

In the curing agent (B), a neutral or alkaline inorganic salt, for example, tripolyphosphate, pyrophosphate or secondary phosphate, may be added concurrently with a nitrite.

Sodium chloride is normally added to the meat together with (B), but it may be added entirely or partly with (A) if so desired.

Such compositions (A) and (B) containing the additives in described combination and caused to be absorbed into the meat, by such means as injection, impregnation or dipping if they are in liquid form (aqueous solution, organic solvent solution, emulsion or suspension), or by spraying or daubing if they are in powder form.

It is normally preferred to first add the curing agent (B) containing sodium chloride, a neutral or weakly alkaline inorganic salt and nitrite radicals to the meat, to allow suitable scattering and distribution of nitrite radicals in the meat, and thereafter, to add the composition (A). Such earlier addition of nitrite radicals cause conspicuous scattering and dilution of the radicals, completely eliminating their reaction with the subsequently added components of (A). The nitrite radicals also are consumed by their reactions with meat protein, hemoglobin, myoglobin and the like, and are markedly reduced before (A) is added. Thus their contact with (A) at reactable concentrations is still more effectively prevented.

It is permissible, however, to first add (A) and then, (B). For example, if sodium erythorbate and potassium sorbate are injected as (A) and then sodium nitrite, as (B), either (B) is slowly injected into meat over a prolonged period to avoid its contact with (A) components at reactable concentrations, or it is used in the form of a diluted solution, or injected through an injector having many needles. With such practices the objects of this invention can be satisfactorily achieved. For this reason the addition order of (A) and (B) is optional.

It is also permissible to inject (A) and (B) at the same time at different points on a belly. For example, if the distance between the points at which (A) and (B) are injected is more than 5 mm, the contact with a high concentration of sodium nitrite in (B) and the components in (A) are avoided in the belly.

When meat lump is used as a starting meat especially for production of ham and bacon, a method of injecting an aqueous solution (pickle solution) is most commonly employed to effect a uniform distribution of the additives throughout the meat lump. The addition can be effected, however, by dipping the meat in the aqueous solution, spraying the powdery composition of the additives on the surfaces of the meat lump and rubbing the powder thereinto, or by daubing the solution onto the meat lump to cause an impregnation. These adding methods may be optionally combined, so long as the components (A) and (B) are added separately.

As a general rule for avoiding the reactions among the two compositions, the composition (B) is added first by the dipping and spraying methods to allow their uniform dispersion in the meat, and then the composition (A) is added. It is possible, however, to treat the meat, to which the composition (A) has been added, with the composition (B) sufficiently diluted with sodium chloride or other salts.

If the injection method is employed, the total amount of the pickle solutions to be injected is normally about 5 to 30%, preferably about 10 to 20%, based on the weight of meat. When the compositions (A) and (B) are injected separately as the aqueous solutions, their amounts may be the same or different, normally 5-15% of the pickle solution (A) and 15-5% of the solution (B) being injected. The concentrations of the additives in the pickle solution are determined according to the target amounts of the individual additives to be added to the meat, and the injection amounts of the pickle solutions. Also in the dipping method or rubbing-in method, the concentrations in the dipping liquid and dipping time, or the amount of the composition to be rubbed in, for achieving the infiltration of the target amounts of the additives into the meat, can be easily determined by preliminary experiments.

As already mentioned, the characteristic feature of this invention lies in the prevention of possible mutagen formation by adding the organic or acidic substances reactable with nitrite to the meat, separately from nitrite.

Obviously these substances eventually come into mutual contact, but the opportunity is substantially reduced. When a pickle solution containing sodium erythorbate and a nitrite is injected into meat by 10% according to the conventional practice, the two components are concurrently present in the solution at such high concentrations as ten times that of their amounts to be added to the meat. In contrast thereto, if the composition (B) is first added to the meat and then the composition (A) according to one embodiment of this invention, the amount of the nitrite in the meat is reduced to one-tenth of that in the conventional method to start with, which is in fact further reduced as consumed by the reactions with the meat components. The erythorbate injected thereinto comes into contact with the nitrite, also at a concentration reduced to one-tenth. Conventionally, sodium erythorbate is used at a concentration in the meat of 550 ppm, and sodium nitrite, at 40, 120, or 156 ppm. Hence, if 10% by weight of the meat of the pickle solution is to be injected, the two compounds contact in the solution at such high concentrations as 5500 ppm of sodium erythorbate and 400, 1200 or 1560 ppm of sodium nitrite, unavoidably reacting with each other. It is apparent that such contact of the two must be avoided.

As already mentioned, addition of nitrite involves the dangers of nitrosamines formation and $NO_2^-$ toxicity. Therefore it is most desirable to reduce its amount as much as possible, for example, to no more than 40 ppm, but no less than 10 ppm, as sodium nitrite, by such means as concurrent use of a preservative, for example, sorbic acid. At the concentration of 40 ppm, sodium nitrite does not react with erythorbic acid or other additives. Hence, by the separate addition of the thick solution, the third defect of nitrite radicals, i.e., its reactions with the additives, is also completely eliminated, and safe ham and bacon can be produced. Furthermore, our working examples given later prove that, in aqueous solutions, 120 ppm of sodium nitrite and 550 ppm of sodium erythorbate or 0.2% of potassium sorbate as sorbate radicals cause no reaction. It is obvious, therefore, in the meat wherein sodium nitrite is largely consumed, 156 ppm of sodium nitrite as used with ham causes no reaction with sodium erythorbate or potassium sorbate. Thus the separate addition of the composition (B) containing sodium nitrite from the composition (A), as an essential requirement of this invention, for the first time enabled the production of safe meat products such as ham and bacon.

Sodium chloride, the other chief component of the pickle solution, is normally added to the meat, in an amount of 1-1.5% by weight. Consequently, if the pickle solution is to be added to meat by 10 weight%, the sodium chloride concentration in the pickle solution is 10-15%. The sodium chloride can be dissolved in pickle solutions (A) and (B) at any optional ratio, so long as the total reaches the target amount (to the meat weight). It is also permissible to add an alkali salt such as sodium tripolyphosphate to the (B) solution, in an amount of about 0.2% to the meat weight. Preferably the solution has a neutral or weakly alkaline pH not higher than 9.0. The amounts of the composition (A) constituents to be added to the meat are normally as follows: amino acids as the condiments, about 0.2%; ascorbic acid (or its salts), erythorbic acid (or its salts), their higher fatty acid esters or their higher acetals, tocopherols, etc., as the reducing agent, about 300-600 ppm; sorbic acid or its potassium salt as the preservative, about 0.05-0.26% as sorbic acid; $C_8$-$C_{12}$ glycerol fatty acid ester, about 50-500 ppm; and various acidic substances such as organic acids and inorganic acidic salts, about 0.02-0.4% to the meat weight, which is variable depending on the acidity level of the acidic substance and the intended pH and water retaining property of the ham or bacon.

Particularly in the case of adding sorbic acid, it is used as a suspension when there can be a danger that its solution in organic solvents or in a pickle solution (A) having a pH lowered by the addition of an acid may have a detrimental effect on the starting meat, and yet a strong antibotulinal activity is required. When sorbic acid is so added as an aqueous suspension, the sorbic acid is slowly dissolved in the meat and penetrates. The dissolved sorbic acid concentration is low, little affecting the water retaining property of the meat.

The aqueous suspension of sorbic acid can be easily prepared by, for example, suspending fine particles of sorbic acid such as those not greater than 100 microns in diameter, in about 0.1-2.0% solution of a natural or artificial paste such as guar gum, together with a minor amount of a hydrophilic surfactant, e.g., lecithin, Span, Tween or sucrose ester. A minor amount, e.g., 0.1-2%, of a polyhydric alcohol, or glucide may also be added to the suspension.

An organic solvent solution of sorbic acid can be obtained by, for example, using propylene glycol. Any edible solvent can be used at a level effectively dissolving sorbic acid.

Hereinafter the invention will be more specifically illustrated with reference to the working examples, in which all percents are by weight.

EXAMPLE 1

(1) Reaction of NaNO₂ and/or NaEry in a pickle solution (contact at high concentrations)

A pickle solution containing 15% of sodium chloride, 2% of sodium tripolyphosphate and 1200 ppm of sodium nitrite ($NaNO_2$); a pickle solution containing 15% of sodium chloride, 2% of sodium tripolyphosphate and 5500 ppm of sodium erythorbate (NaEry); and a pickle solution containing 15% of sodium chloride, 2% of sodium tripolyphosphate, 1200 ppm of sodium nitrite ($NaNO_2$) and 5500 ppm of sodium erythorbate (NaEry) were prepared. Since the pickle solutions are normally injected in an amount of 10% based on the weight of meat, the concentrations of the individual additives in the solutions were ten times as large as those usually added to meat.

Each of these pickle solutions was maintained at 3° C. for 20 hours, and extracted twice with ethyl ether. The ethereal layers were collected and washed twice with water. Then, the ether was removed by distillation under reduced pressure. The residue was dissolved in 5 ml of ethyl ether. The resulting solution was impregnated into a disc, and subjected to the rec-assay by a modified method of Hirano et al. involving the use of spores of *Bacillus subtilis* H-17 (Rec+) and M-45 (Rec−) strains. In the rec-assay, N-methyl-N'-nitro-N-nitrosoguanidine was used as a positive control, and kanamycin, as a negative control, each at a concentration of 10 μg in the disc. The results of the rec-assay are shown in Table 1.

It is seen from Table 1 that when sodium nitrite and sodium erythorbate are placed together for a long period of time, the result of the rec-assay is positive. Although the degree of this positive result is much weaker than that of N-methyl-N'-nitro-N-nitroguanidine used as a positive control, the result suggests the formation of an ether-extractable rec-assay positive substance.

It is seen from the results that in order to provide safe meat products by avoiding the formation of a mutagen, it is necessary to avoid direct contact between the erythorbate and the nitrite and to add them separately to meat.

TABLE 1

| Concentrations of the additives in the pickle solution | (Rec+) Diameter of an inhibitory zone (mm) | (Rec−) Diameter of an inhibitoray zone (mm) | (Rec−) − (Rec+) |
|---|---|---|---|
| $NaNO_2$ 1200 ppm | 0 | 0 | 0 |
| NaEry 5500 ppm | 0 | 0 | 0 |
| $NaNO_2$ 1200 ppm NaEry 5500 ppm | 0 | 10.1 | 10.1* |
| Positive control | 2.1 | 23.7 | 21.6* |
| Negative control | 8.6 | 9.4 | 0.8 |
| Ethyl ether | 0 | 0 | 0 |

*The asterisked figures mean positiveness.

(2) Reaction of NaNO₂ and/or NaEry in the meat (contact at low concentrations)

The concentration of the additives in the pickle solutions used in (1) were reduced to one-tenth respectively, to simulate their actual concentrations in the meat. The test lots are as shown in Table 2 below.

TABLE 2

| Run No. | Sodium chloride (%) | Sodium tri-polyphosphate (%) | Sodium nitrite (ppm) | Sodium erythorbate (ppm) |
|---|---|---|---|---|
| 1 | 1.5 | 0.2 | 0 | 0 |
| 2 | 1.5 | 0.2 | 120 | 0 |
| 3 | 1.5 | 0.2 | 120 | 550 |

These pickle solutions were treated as follows. The pickle solutions each prepared according to the predetermined recipe (of which pH had been adjusted to 6.0 with hydrochloric acid) were maintained at 38° C. for 3 hours, at 50° C. for 3 hours, and at 57° C. for 2 hours (conventional heating conditions of meat products such as bacon). Thereafter their ether extracts were recovered by the method described in (1) above, and subjected to the rec-assay by Kada's method. The results are as shown in Table 3 below.

TABLE 3

| Run No. | Rec+ Diameter of inhibitory zone (mm) | Rec− Diameter of inhibitory zone (mm) | (Rec−) − (Rec+) | Judge |
|---|---|---|---|---|
| 1 | 0 | 0 | 0 | |
|   | 0 | 0 | 0 | — |
|   | 0 | 0 | 0 | |
| 2 | 0 | 0 | 0 | |
|   | 0 | 1 | 1 | — |
| 3 | 0 | 2 | 2 | — |

(Note: The extract was dissolved in 5 ml of ethyl ether, and 200 μl of the solution was impregnated in a disc to be subjected to the rec-assay. The size of the inhibitory zone was determined by repeating the test twice. It can be seen from the above results that formation of no mutagen was recognized when the concentrations of the additives in the pickle solution were reduced to one-tenth those of 1).

EXAMPLE 2

(1) Reaction of NaNO₂ with potassium sorbate and/or sodium erythorbate in a pickle solution (contact at high concentrations)

Pickle solutions each containing 15% of sodium chloride, 2% of sodium tripolyphosphate, and varied amounts of potassium sorbate (SoK), sodium nitrite ($NaNO_2$) and sodium erythorbate (NaEry) at varied combinations, were prepared. Since the pickle solutions are normally injected in an amount of 10% based on the weight of meat, the concentrations of the individual additives in the solutions were ten times as high as those usually added to the meat. The specific combination of the additives and their concentrations in each pickle solution are shown in the first column of Table 4.

These pickle solutions were treated similarly to Example 1, and subjected to rec-assay (after the storage at 3° C. for 20 hours). The results of rec-assay are as in Table 4 below.

TABLE 4

Rec-assay of ether extract from actually used pickle solution

| Concentrations of the additives in the pickle solution | 3° C., 20 hours | | | | Difference in** the mean values |
|---|---|---|---|---|---|
| | (Rec+) | | (Rec−) | | |
| | Inhibitory* zone | Mean | Inhibitory* zone | Mean | |
| NaNO₂ 400 ppm | 0 | 0 | 0 | 0 | 0 |
| | 0 | | 0 | | |
| NaNO₂ 400 ppm | 0.9 | | 11.1 | | |
| | | 1.1 | | 10.4 | 9.3(P) |
| SoK 2.6% | 1.3 | | 9.7 | | |
| NaNO₂ 400 ppm | 2.5 | | 6.8 | | |
| NaEry 5500 ppm | | 2.5 | | 7.0 | 4.5(P) |
| SoK 2.6% | 2.5 | | 7.2 | | |
| | 5.3 | | 6.5 | | |
| SoK 2.6% | | 5.1 | | 6.7 | 1.6 |
| | 4.8 | | 6.9 | | |
| | 2.1 | | 23.6 | | |
| Positive control | | 2.1 | | 23.6 | 21.5(P) |
| | 2.1 | | 23.6 | | |
| | 9.3 | | 9.4 | | |
| Negative control | | 8.7 | | 9.4 | 0.7 |
| | 8.0 | | 9.4 | | |
| | 0 | | 0 | | |
| Ethyl ether | | 0 | | 0 | 0 |
| | 0 | | 0 | | |

*Diameter of inhibitory zone (mm)
**Difference in mean values = mean (Rec−) − mean (Rec+)
(P)denotes that the substance was judged positive.

It can be seen from Table 1 that when sodium nitrite and sodium erythorbate are left together for a prolonged period, the result of the rec-assay is positive. It can be seen from Table 4 that the same result was obtained also when sodium nitrite and potassium sorbate are left together for a long time. Although the degree of positiveness is much weaker than that of N-methyl-N'-nitro-N-nitroguanidine used as the positive control, the result suggests the formation of an ether-extractable rec-assay positive substance. When sodium nitrite, potassium sorbate and sodium erythorbate were put together, the effect of putting either two of them together was weakened, but the reaction at the borderline of positive and negative zones was recognized. From these results, it is apparent that in order to provide safe meat products by avoiding the formation of a mutagen, it is necessary to avoid direct contact between the sorbate or erythorbate with nitrite, and to add them separately to meat.

(2) Reaction of NaNO₂ with potassium sorbate and/or sodium erythorbate in the meat (contact at low concentrations)

Pickle solutions each containing 1.5% of sodium chloride, 0.2% of sodium tripolyphosphate, and potassium sorbate, sodium nitrite and sodium erythorbate at the concentrations corresponding to those in the meat, at various combinations, were prepared, and their pH was adjusted to 6.0 with hydrochloric acid, the pH level of the meat. The solutions were maintained at 38° C. for 3 hours, at 50° C. for 3 hours, and at 57° C. for 2 hours, according to the normal heating conditions for making bacon.

The combination of additives and their concentrations in each pickle solution are as shown in the first column of Table 5. The method of rec-assay was the same as described in Example 1, and the results were as shown also in Table 5.

TABLE 5

Rec-assay of the ether extracts from diluted pickle solutions corresponding to that used in bacon processing

| | | Na tripolyphosphate (0.2) and NaCl (1.5) | | | | | | |
|---|---|---|---|---|---|---|---|---|
| | | First | | | Second | | | |
| Substance | μl/disc | Rec+ | Rec− | Dif | Rec+ | Rec− | Dif | Judge |
| | 200 | 0 | 0 | 0 | 0 | 0 | 0 | |
| Ether | 40 | 0 | 0 | 0 | 0 | 0 | 0 | * |
| | 200 | 0 | 0 | 0 | 0 | 0 | 0 | |
| NaNO₂ (0.004) | 40 | 0 | 0 | 0 | 0 | 0 | 0 | ** |
| SoK (0.26) | 200 | 4 | 4 | 0 | 3 | 4 | 1 | |
| NaNO₂ (0.004) SoK (0.26) | 40 | 0 | 0 | 0 | 0 | 0 | 0 | — |
| NaNO₂ (0.004) | 200 | 4 | 5 | 1 | 4 | 5 | 1 | ± |
| NaEry (0.055) | 40 | 1 | 2 | 1 | 0 | 2 | 2 | |
| SoK (0.26) | 200 | 4 | 5 | 1 | 4 | 4 | 0 | |
| NaNO₂ (0.012) SoK (0.26) | 40 | 0 | 0 | 0 | 0 | 0 | 0 | — |
| NaNO₂ (0.012) | 200 | 5 | 6 | 1 | 4 | 5 | 1 | ± |
| NaEry (0.055) | 40 | 1 | 2 | 1 | 0 | 2 | 2 | |
| | 200 | 0 | 0 | 0 | 0 | 0 | 0 | |
| NaNO₂ (0.012) | 40 | 0 | 0 | 0 | 0 | 0 | 0 | ** |
| | 200 | 2 | 3 | 1 | 3 | 4 | 1 | |

TABLE 5-continued

Rec-assay of the ether extracts from diluted pickle solutions corresponding to that used in bacon processing

| Substance | μl/ disc | Na tripolyphosphate (0.2) and NaCl (1.5) | | | | | | Judge |
|---|---|---|---|---|---|---|---|---|
| | | First | | | Second | | | |
| | | Rec+ | Rec− | Dif | Rec+ | Rec− | Dif | |
| SoK (0.26) | 40 | 0 | 0 | 0 | 0 | 0 | 0 | — |
| MNNG | 10 | 1 | 8 | 7 | 2 | 9 | 7 | + |
| Kanamycin | 10 | 7 | 7 | 0 | 6 | 6 | 0 | |

MNNG: N-methyl-N'-nitro-N-nitrosoguanidine
Dif: Difference
*Use of ether as extraction solvent is shown to be proper for rec-assay experiments (i.e. if an inhibitory zone occurs in an extraction solvent, the experiments become meaningless).
**The production of rec-assay positive substances is not observed in case of single use of $NaNO_2$ in an amount to provide concentration usually applied to meat.

As is apparent from the results of Table 5, the mutagenicity examination of the pickle solutions formulated to have the concentrations similar to those in the meat and heated according to the conventional meat processing conditions, proved negative as to all cases of single or combined use of $NaNO_2$, SoK and NaEry at various concentrations. Consequently, it became clear that these additives can be used in the production of safe ham and bacon, so long as their contact at high concentrations is avoided.

EXAMPLE 3

This example shows that the practice of this invention with bacon made it possible to reduce the residual nitrite effectively, still more to reduce the N-nitrosopyrrolidine formation and furthermore to get the excellent antibotulinal activity.

As the starting meat material, approx. 4 kg of pork belly (approx. 30 cm×50 cm×4–7 cm) was used. Curing agent for control was singly injected into the belly, and the pickle solution (B) and the suspension (A) were separately injected to the belly (this invention). The total amount of the pickle solution was 10% based on the weight of meat. When two pickles were used, they were injected each in an amount of 5% separately to meat (first the solution B and then the suspension A). The amount of the pickle solution injected and the concentrations of the additives in the pickles in each run are shown in Table 6. The parenthesized figures in Table 6 represent percentages of the additives in belly added by the injection of the pickles. As is seen from Table 6, when one pickle solution was used (Run Nos. 1 and 2), its amount injected was 10% based on the weight of meat. Hence, the concentrations of the individual additives in the pickle solution are ten times the amounts of the additives added to meat (the parenthesized figures). When two pickles were used (Run Nos. 3 to 14), they were separately injected each in an amount of 5%. Hence, the concentrations of the individual additives in each pickles are 20 times the amounts of the additives added to meat (the parenthesized figures).

The meat lump into which the pickle solution had been injected was allowed to stand overnight in a refrigerator at 0° to 2° C. to be cured. Then, it was dried at 30° C. to 50° C. for 3 hours, smoked at 70° C. for 5 hours, and cooled to produce bacon.

The bacon obtained was sliced to a thickness of 2.5 to 3.0 mm by means of a ham slicer sterilized and disinfected by 70% alcohol. Samples were chosen at random from the bacon slices, and subjected to the following tests.

pH measurement

After blending 5 gr of a sample with 45 ml of water, its pH was measured with a glass electrode pH meter.

Anti-botulinal property test

The sliced bacon was inoculated with A-type and B-type C. botulinum spores. The inoculation was effected by the method of Christiansen et al. using sterilized sand as the carrier of the spores (Appl. Microbiol., 27, 733–737, 1974) at the ratio of $10^3$ spores/gr.

Approximately °gr each of thus inoculated bacon was vacuum packed in plastic packs and stored at 27° C. The state of swelling of the packages and the toxin production were examined.

Toxicity test was carried out as follows. Every 20 gr of samples prepared as above was placed in a blender cup. 40 ml of 0.1 M phosphate buffer solution (pH 6.0) was added to a blender cup and homogenized. After the homogenates were centrifuged at 15,000×G for 15 min. at 0° C., 0.5 ml each of the supernatants was injected intraperitoneally into two mice (DDY strain, body weight 15–20 gr) and their fate was observed for four days. Also as an anti-toxin neutralization test, the supernatants heated for 20 min. at 80° C. were similarly injected into mice.

Antibotulinal activity level is indicated by the number of days passed before the swelling and toxin formation was first recognized.

Determination of N-nitrosopyrrolidine

Sliced bacon samples were fried for 6 min. (3 min. each side) at 171° C. (340° F.) on an electric hot plate cooker coated with Teflon. Then these fried bacons were analyzed by the Fine et al. vacuum distillation method and a gas chromatographic-thermal energy analyzer (Anl. Chem. Acta., 78, 383, 1975).

On the occasion of carrying out this invention, the suspension (A) was used under the condition that sorbic acid fine powder (the average particle diameter was below 100μ) was suspended in the solution containing 0.5% guar gum and 0.22% glycerin, and 0.96% citric acid, 1.1% sodium ascorbate and 0.24% fatty acid monoglyceride were dissolved or suspended at the same time in this suspension for the injection.

The test results are collectively shown in Table 7. The data prove that in the bacon prepared according to the present invention, the residual nitrite ($NO_2^-$) and N-nitrosopyrrolidine formation are less than those of conventional products and furthermore the anti-botulinal activity can be improved.

In the process of this invention, it is clear that sodium ascorbate and ascorbyl palmitate are both effective to reduce still more the N-nitrosopyrrolidine formation, and the addition of 120 ppm of monolauryl glyceride or monocaprylyl glyceride improves preservability furthermore.

TABLE 6

| | Pickles B | | Pickles A | | |
|---|---|---|---|---|---|
| Run No. | Sodium nitrite (ppm) | Sorbic acid (%) | Acidic compound (%) | Reductant (%) | Glycerol ester of fatty acid (%) |
| 1 | 1200 (120) | | | | |
| 2 | 1560 (156) | | | | |
| 3 | 800 (40) | 4 (0.2) | | | |
| 4 | 800 (40) | 4 (0.2) | | Na-Asc. 1.1 (550 ppm) | |
| 5 | 800 (40) | 4 (0.2) | | | $C_{12}M$ 0.24 (120 ppm) |
| 6 | 800 (40) | 2.4 | C.A. 0.96 (0.048) | | |
| 7 | 800 (40) | 2.4 | C.A. 0.96 (0.048) | Na-Asc. 1.1 (550 ppm) | |
| 8 | 800 (40) | 2.4 (0.12) | C.A. 0.96 (0.048) | | $C_{12}M$ 0.24 (120 ppm) |
| 9 | 800 (40) | 4 (0.2) | | Ascorbyl palmitate 1.1 (550 ppm) | |
| 10 | 800 (40) | 4 (0.2) | | | $C_8M$ 0.24 (120 ppm) |
| 11 | 800 (40) | 2.4 (0.12) | SHMP 8.0 (0.4) | | |
| 12 | 800 (40) | 2.4 (0.12) | SHMP 8.0 (0.4) | Ascorbyl palmitate 1.1 (550 ppm) | |
| 13 | 800 (40) | 2.4 (0.12) | SHMP 8.0 (0.4) | | $C_8M$ 0.24 (120 ppm) |

C.A.: Citric acid,
Na-Asc.: Sodium ascorbate,
$C_{12}M$: monolauryl glyceride,
SHMP: Sodium hexametaphosphate,
$C_8M$: Monocaprylyl glyceride

TABLE 7

| | | Residual nitrite $NO_2^-$ (ppm) | | | Antibotulinal effects (preservation period) | |
|---|---|---|---|---|---|---|
| Run No. | pH in bacon | Before frying | After frying | NPYR (ppb) | First day detected toxin | First day observed swelling |
| 1 | 6.23 | 49.1 | 5.7 | 18.1 | 6 | 6 |
| 2 | 6.25 | 52.2 | 6.8 | 19.7 | 7 | 7 |
| 3 | 5.71 | 9.7 | ND | 4.3 | 11 | 13 |
| 4 | 5.72 | 5.7 | ND | 1.0 | 11 | 13 |
| 5 | 5.71 | 9.5 | ND | 4.2 | 13 | 15 |
| 6 | 5.68 | 9.6 | ND | 3.8 | 12 | 13 |
| 7 | 5.67 | 5.3 | ND | 0.7 | 12 | 13 |
| 8 | 5.66 | 9.4 | ND | 4.0 | 14 | 15 |
| 9 | 5.70 | 5.4 | ND | 1.1 | 11 | 12 |
| 10 | 5.72 | 9.7 | ND | 4.3 | 13 | 14 |
| 11 | 5.95 | 10.3 | ND | 5.2 | 9 | 10 |
| 12 | 5.95 | 10.5 | ND | 1.5 | 9 | 10 |
| 13 | 5.97 | 11.0 | ND | 5.5 | 12 | 14 |

ND: Not detected.

EXAMPLE 4

In this example, the anti-botulinal activity, the residual nitrite ($NO_2^-$) and the N-nitrosopyrrolidine formation were examined with bacon processed by injecting sorbic acid or sorbic acid suspension containing citric acid, sodium erythorbate and/or monolauryl glyceride (A) and pickle solution (B) containing sodium nitrite, separately.

Preparation of bacon and experimental methods were the same as in Example 3. The injecting methods of additives were carried out as follows.

A pickle solution containing 0.12% sodium nitrite, 15% sodium chloride, 1% sugar and 2% polyphosphate was injected in an amount of 10% based on the weight of meat. On the other hand, according to the process of this invention (Run Nos. 2–5), first a pickle solution (B) containing 0.08% sodium nitrite, 13% sodium chloride, 2% sugar and 4% polyphosphate was injected in an amount of 5% based on the weight of meat. Then a suspension (A) containing 4.0% sorbic acid (Run No. 2), 2.7% sorbic acid and 0.78% citric acid (Run No. 3), 2.7% sorbic acid, 0.78% citric acid and 1.1% sodium erythorbate (Run No. 4) or 2.7% sorbic acid, 0.78% citric acid, 1.1% sodium erythorbate and 0.24% monolauryl glyceride ($C_{12}M$) (Run No. 5), respectively was injected in an amount of 5%, based on the weight of the meat, separately from a pickle solution (B).

The concentration of the additives in the pickles (A) and (B) in each run are shown in Table 8. The parenthesized figures in Table 8 represent percentages of the additives in meat.

In Run No. 6, the injection was carried out by the conventional method injecting a mixed solution containing sodium nitrite and sodium erythorbate in an amount of 10% based on the weight of meat.

The results are summarized in Table 9. It is seen from Table 9 that in Run Nos. 2–5 in accordance with this invention which comprises separately injecting a pickle solution containing sodium nitrite and a suspension containing sorbic acid to meat, a decrease in the amount of residual nitrite radicals ($NO_2^-$), a decrease in the amount of residual nitrite in combined use with sodium erythorbate and an extreme decrease in the amount of N-nitrosopyrrolidine formation were noted in comparison with the injection of solution containing sodium nitrite (Run No. 1) and the conventional method (Run No. 6).

In accordance with this invention, anti-botulinal activity was still more improved and the color formation ability was good.

TABLE 8

| | | Water system suspension (A) | | | |
|---|---|---|---|---|---|
| Run No. | Pickles (B) $NaNO_2$ (ppm) | Sorbic acid (%) | Citric acid (%) | Sodium erythorbate (%) | Monolauryl glyceride (%) |
| 1 | 1200 (120) | | | | |
| 2 (this invention) | 800 (40) | 4.0 (0.2) | | | |
| 3 (this invention) | 800 (40) | 2.7 (0.135) | 0.78 (0.039) | | |
| 4 (this invention) | 800 (40) | 2.7 (0.135) | 0.78 (0.039) | 1.1 (0.055) | |
| 5 (this invention) | (00 (40) | 2.7 (0.135) | 0.78 (0.039) | 1.1 (0.055) | 0.24 (0.012) |
| 6 | $NaNO_2$ 1200 (120) | | | | |

TABLE 8-continued

| Run No. | Pickles (B) NaNO2 (ppm) | Water system suspension (A) | | | |
|---|---|---|---|---|---|
| | | Sorbic acid (%) | Citric acid (%) | Sodium erythor- bate (%) | Mono- lauryl glyceride (%) |
| | NaEry 5500 (550) | | | | |

TABLE 9

| Run No. | pH | Residual nitrite ($NO_2^-$) | | NPYR (ppb) | Anti- botulinal resistance | |
|---|---|---|---|---|---|---|
| | | Before frying (ppm) | After frying (ppm) | | First day detected toxin | First day observed swelling |
| 1 | 6.31 | 45.5 | 31.5 | 15.5 | 5 | 5 |
| 2 (this invention) | 5.79 | 9.9 | 6.5 | 2.3 | 11 | 13 |
| 3 (this invention) | 5.76 | 10.0 | 7.0 | 1.0 | 12 | 14 |
| 4 (this invention) | 5.75 | 5.1 | 2.9 | ND | 12 | 14 |
| 5 (this invention) | 5.77 | 4.9 | 2.7 | ND | 20 | 23 |
| 6 | 6.32 | 32.4 | 24.0 | 10.2 | 4 | 5 |

ND: Not detected.

EXAMPLE 5

In this example, the anti-botulinal activity, the residual nitrite and the N-nitrosopyrrolidine formation were examined with bacon processed by injecting a potassium sorbate solution (Pickle Liquid (A)-Run Nos. 2 and 3 in Table 10); (Injection A) or a liquid (Injection A) in which both sorbic acid and potassium sorbate were suspended in a 5% propylene glycol solution (Pickle Liquid (A)-Run No. 4 in Table 10); and a pickle solution (Injection B) containing sodium nitrite separately.

Preparation of bacon and experimental methods were the same as in Example 3. The concentrations of sodium chloride and polyphosphate are common in all lots. The concentrations of the main additives in the pickles (A) and (B) are shown in Table 10. The parenthesized figures in Table 10 represent percentages of the additives in meat.

In Run No. 1, the pickle solution (B) was injected in an amount of 10% based on the weight of meat. In Run Nos. 2-5 in accordance with this invention, first the pickle solution (B) and then the pickle liquid (A) was injected each in an amount of 5% to meat separately.

The results are summarized in Table 11. It is seen from Table 11 that in Run Nos. 2-5, in accordance with this invention which comprises separately injecting a pickles (A) and (B) to meat, a decrease in the amount of residual nitrite radicals ($NO_2^-$) and the N-nitrosopyrrolidine formation were noted in comparison with the control lot (Run No. 1). In accordance with this invention, antibotulinal activity was also improved.

TABLE 10

| Run No. | Pickle solution (B) NaNO2 (ppm) | Pickle liquid (A) | | |
|---|---|---|---|---|
| | | The liquid containing potassium sorbate and/or sorbic acid (%) | | Reductant (%) |
| 1 | 1200 (120) | | | |
| 2 (this invention) | 800 (40) | Aqueous solution containing potassium sorbate | 5.2 (0.26) | |
| 3 (this invention) | 800 (40) | Aqueous solution containing potassium sorbate | 5.2 (0.26) | Vitamin E 1.0 (0.05) |
| 4 (this invention) | 800 (40) | Water system suspension mixed propylene glycol containing sorbic acid and potassium sorbate dissolved with water. The composition of the mixture is as follows. Sorbic acid 2.0 (0.1) Potassium sorbate 2.6 (0.13) Propylene glycol 5 (0.25) Water 90.4 (4.52) Total 100.0 (5) | | |
| 5 (this invention) | | Same composition as in Run No. 4 | | Vitamin E 1.0 (0.05) |

TABLE 11

| Run No. | pH in bacon | Residual nitrite ($NO_2^-$) | | NPYR (ppb) | Anti-botulinal effect | |
|---|---|---|---|---|---|---|
| | | Before frying (ppm) | After frying (ppm) | | First day detected toxin | First day observed swelling |
| 1 | 6.08 | 42.5 | 31.2 | 14.9 | 9 | 9 |
| 2 (this invention) | 5.99 | 13.2 | 8.4 | 4.4 | 12 | 14 |
| 3 (this invention) | 6.04 | 12.1 | 7.9 | 2.9 | 13 | 15 |
| 4 (this invention) | 5.73 | 7.2 | 5.5 | 1.3 | 22 | 25 |
| 5 (this invention) | 5.75 | 5.9 | 4.0 | ND | 25 | 28 |

ND: Not detected.

EXAMPLE 6

This Example was carried out for confirming the antibotulinal activity by adding potassium sorbate in loin rolled ham with a reduced sodium nitrite. Curing agents of the concentrations and composition as shown in Table 12 were added into approximately 300 g of pork loin cut into blocks of same size. The meat into which a pickle solution had been injected and/or a dry curing agent had been rubbed were cured for 5 days at 0° C. Then the cured meat was vacuum-packed, boiled for 90 minutes at about 75° C., and cooled rapidly to provided loin rolled ham. In the case of the rubbing method, since it had been confirmed by the preliminary experiments that one-fourth of the used additives penetrate into meat, four times the amounts of the additives to be added to the meat was rubbed in.

The parenthesized figures in Table 12 represent percentages of the amounts of the additives added to the meat by the injection of the pickles in the case of the pickle solution, but as to the dry curing agent (powder), they are those rubbed into the meat, denoting that ¼ of the given figures penetrated into the meat. The measurement of the pH value, moisture content and the residual nitrite (NO₂⁻); and the sensory evaluation of color formation ability and color development of thus obtained ham were carried out similarly to Examples 3 and 4. Furthermore, the ham samples were evaluated by eight panelists as to the color and texture. The following rating was made in five grades: 2-good; 1-fairly good; 0-same; -1-rather poor; -2-poor.

Score was indicated by the average in Table 13.

The *Clostridium botulinum* resistance of the loin sliced rolled ham was examined similarly to Example 4. The sliced loin rolled ham was vacuum-packed, kept at 27° C., and the swelling of the packages was observed.

The number of days passed before the swelling was first detected was expressed as the preservation period. The results are collectively shown in Table 13.

Reduced residual nitrite levels and strong antibotulinal stability of the products of this invention are clearly seen by this Table 13.

TABLE 12

| Run No. | The kinds of curing agent | Amount and method added curing agent to a meat | Sodium chloride | Poly-phosphate | NaNO₂ | Potassium sorbate | Sodium erythorbate | Crystal smokes |
|---|---|---|---|---|---|---|---|---|
| 1 | Pickle solution (B) | Injection 10% of (B) | 30 (3) | 3 (0.3) | 0.12 (0.12) | | 0.55 (0.055) | 2 (0.2) |
| 2 (this invention) | Pickle solution (B) | After injection, 5% of (B) into a meat, 5% of (A) was reinjected into same meat. | 30 (1.5) | 6 (0.3) | 0.08 (0.004) | | | |
| | Pickle solution (A) | | 30 (1.5) | | | 5.2 (0.26) | 1.1 (0.055) | 4 (0.2) |
| 3 (this invention) | Drying curing agent (B) | After rubbing, 7.216% of (B) into a meat, 10% of (A) was reinjected into same meat. | 83.1 (6) | 16.6 (1.2) | 0.22* (0.016) | | | |
| | Pickle solution (A) | | 15 (1.5) | | | 2.6 (0.26) | 1.1 (0.055) | 2 (0.2) |

*Sodium nitrite added into a meat is the amount of 0.004% actually.

TABLE 13

| Run No. | pH | Moisture contents (%) | Residual nitrite (NO₂⁻) (ppm) | Sorbic acid contents (%) | Color formation ability | Sensory tests | | First day observed spoil | Anti-botulinal resistance | |
|---|---|---|---|---|---|---|---|---|---|---|
| | | | | | | Color development | Texture | | First day detected toxin | First observed swelling |
| 1 | 6.43 | 57.7 | 24.6 | — | 0.461 | 0 | 0 | 12 | 2.5 | 2.5 |
| 2 (this invention) | 6.40 | 56.9 | 5.4 | 0.20 | 0.471 | 0.4 | 0.3 | 20 | 4 | 6 |
| 3 (this invention) | 6.41 | 55.2 | 7.2 | 0.18 | 0.465 | 0.2 | 0.2 | 20 | 5 | 6 |

EXAMPLE 7

This example exhibits the antibotulinal activity and N-nitrosopyrrolidine formation-inhibiting action of sorbic acid, citric acid and/or a fatty acid monoglyceride ($C_8$–$C_{12}$) added to bacon with a reduced sodium nitrite level. The bacon was produced using 4 kg of pork belly (about 30×50×4–7 cm).

Curing agents were added to the bacon by injecting one pickle solution or two pickle liquids (suspension A and solution B). The total amount of the pickle solution (B), when used singly, was 10% based on the weight of meat. When two pickle liquids were used, they were injected each in an amount of 5% separately to meat (first the solution B and then the suspension A). The amounts of the pickle liquids injected and the concentrations of the additives in the pickles in each lots are shown in Table 14. The parenthesized figures in Table 14 represent percentages of the additives added to meat by the injection of the pickles.

The methods of processing bacon, preparation of test samples and the products' analyses were the same as those practiced in Example 3.

The results are summarized in Table 15.

It is seen from Table 15 that the Run Nos. 3–8 in accordance with this invention have equivalent quality reduced residual nitrite (NO₂⁻) level and N-nitrosopyrrolidine formation and clearly superior color development, compared with the conventional product (injection of single pickle solution).

The products according to this invention also showed clearly superior effect of inhibiting the toxin production of *Clostridium botulinum*.

In the control (Run No. 1), 1.5% of sodium chloride, 0.2% of polyphosphate and 0.012% of sodium nitrite were added to the weight of meat.

TABLE 14

| | Pickle liquids | | | Concentrations of additives in pickle liquids (%) | | | | | | |
|---|---|---|---|---|---|---|---|---|---|---|
| Run No. | Kinds | Amount injected into a meat (%) | Injection order | Sodium chloride | Poly-phosphate | $NaNO_2$ | Sorbic acid | Citric acid | Glycerol ester of $C_8$–$C_{12}$ fatty acid | Reductant |
| 1 | B | 10 | — | 15(1.5) | 2(0.2) | 0.12 (0.012) | | | | |
| 2 | B | 10 | — | 15(1.5) | 2(0.2) | 0.12 (0.012) | | | | NaEry 0.55 (0.055) |
| 3 (this invention) | B | 5 | B ↓ | 15(1.5) | 4(0.2) | 0.16 (0.008) | | | | |
| | A | 5 | A | 15(1.5) | | | 2.0 (0.1) | | | |
| 4 (this invention) | B | 5 | B ↓ | 15(1.5) | 4(0.2) | 0.08 (0.004) | | | | |
| | A | 5 | A | 15(1.5) | | | 2.0 (0.1) | | $C_{12}$ 0.25 (0.0125) | |
| 5 (this invention) | B | 5 | B ↓ | 15(1.5) | 4(0.2) | 0.08 (0.004) | | | | |
| | A | 5 | A | 15(1.5) | | | 4.0 (0.2) | | | Vitamin E 1.0(0.05) |
| 6 (this invention) | B | 5 | B ↓ | 15(1.5) | 4(0.2) | 0.08 (0.004) | | | | |
| | A | 5 | A | 15(1.5) | | | 2.7 (0.135) | 0.78 (0.039) | | |
| 7 (this invention) | B | 5 | B ↓ | 15(1.5) | 4(0.2) | 0.08 (0.004) | | | | |
| | A | 5 | A | 15(1.5) | | | 2.0 (0.1) | | $C_{10}$ 0.25 (0.0125) | |
| 8 (this invention) | B | 5 | B ↓ | 15(1.5) | 4(0.2) | 0.08 (0.004) | | | | |
| | A | 5 | A | 15(1.5) | | | 2.0 (0.1) | 1.2 (0.06) | $C_8$ 0.25 (0.0125) | Ascorbyl palmitate 1.0(0.05) |

TABLE 15

| Run No. | pH | Moisture contents (%) | Residual nitrite ($NO_2^-$) (ppm) Frying before | after | Crude fat (%) | Color formation ability | NPYR (ppb) | Antibotulinal effects (number of preserved days) First day detected toxin | First day observed swelling |
|---|---|---|---|---|---|---|---|---|---|
| No. 1 | 6.19 | 37.5 | 52.1 | 3.5 | 48.3 | 0.315 | 12.9 | 7 | 7 |
| No. 2 | 6.22 | 36.8 | 43.9 | 3.2 | 49.5 | 0.344 | 10.6 | 7 | 7 |
| No. 3 | 5.90 | 37.2 | 25.7 | ND | 49.7 | 0.355 | 4.0 | 11 | 13 |
| No. 4 | 5.89 | 36.9 | 15.5 | ND | 48.4 | 0.347 | 4.1 | 11 | 13 |
| No. 5 | 5.70 | 38.3 | 9.8 | ND | 47.9 | 0.359 | 1.5 | 25 | 28 |
| No. 6 | 5.69 | 37.6 | 11.6 | ND | 48.2 | 0.356 | 3.3 | 23 | 25 |
| No. 7 | 5.70 | 38.8 | 12.0 | ND | 47.7 | 0.356 | 3.5 | 22 | 25 |
| No. 8 | 5.68 | 37.1 | 8.7 | ND | 48.5 | 0.361 | 1.1 | 28 | 30 |

ND: Not detected.

And in this invention, 0.26% of potassium sorbate, 120 ppm of fatty acid monoglyceride ($C_{12}$), 0.055% of sodium erythorbate, 1.5% of sodium chloride, 0.2% of polyphosphate and 0.004% of sodium nitrite were added to the weight of meat.

EXAMPLE 8

This example was carried out for confirming the antibotulinal activity of potassium sorbate when added to the bacon of reduced sodium nitrite level.

Bacon was prepared using 4 kg of pork belly (about 30×50×4–7 cm). Curing agents were added by injecting one pickle solution or two pickle solutions (solutions A and B). Total amount of the pickle solution (B), when used singly, was 10% based on the weight of meat. When two pickle solutions were used, they were injected each in an amount of 5% separately to meat (first the solution (B) and then the solution (A)). The kinds and concentrations of the additives in the pickle solution or solutions used in each lot were different.

The test groups, the kinds of pickle solutions, the condition of injection and the concentrations of the additives in the pickle solution are shown in Table 16. As is seen from Table 16, when one pickle solution was used (Run No. 1), the amount injected was 10% based on the weight of meat. Hence, the concentration of the individual additives in the pickle solution were ten times the amounts of the additives added to meat (the parenthesized figures). When two pickle solutions were used (Runs No. 2–4), in accordance with this invention, they were separately injected each in an amount of 5%. Hence, the concentrations of the individual additives in each pickle solution were 20 times the amounts of the additives added to meat (the parenthesized figures). Besides, the parenthesized figures in Table 16 represent percentages of the additives added by the injection of the pickle solution A or B. The method of processing bacon and those of the property measurements were the same as those practiced in Examples 3 and 4.

The determination of residual nitrite ($NO_2^-$) and N-nitrosopyrrolidine contents were practiced similarly to Example 3.

The compositions of the pickle solutions and the manner of their injection are shown in Table 16, and the results are summarized in Table 17, from which it can be understood that the Runs according to this invention exhibit excellent antibotulinal activity and reduced N-nitrosopyrrolidine formation.

experimental design used in each run is shown in Table 18.

The results obtained are summarized in Table 19.

In the bacons processed according to the method using the suspension containing an organic acid and sorbic acid, the reduction of residual nitrite ($-NO_2^-$) and N-nitrosopyrrolidine formation, when fried, and the strong antibotulinal activity were noted. Furthermore, the combined use of a sorbic acid and a reducing agent showed a conspicuous effectiveness for the reduction in residual nitrite ($NO_2^-$), N-nitrosopyrrolidine formation, and for the increase in antibotulinal activity.

TABLE 16

| | Pickle solution | | | Concentrations of additives in the pickle solution (%) | | | | | |
|---|---|---|---|---|---|---|---|---|---|
| Run No. | Kinds | Amounts of the pickle solution injected into a meat | Order of injection | Sodium chloride | Poly-phosphate | NaNO$_2$ | Potassium sorbate | Sodium erythorbate | Glycerol ester of C$_{12}$-fatty acid |
| 1 | B | 10 | — | 15 (1.5) | 2 (0.2) | 0.12 (0.012) | | 0.55 (0.055) | |
| 2 (this invention) | B | 5 | B ↓ | 15 (0.75) | 4 (0.2) | 0.08 (0.004) | | | |
| | A | 5 | A | 15 (0.75) | | | 5.2 (0.26) | 1.1 (0.055) | |
| 3 (this invention) | B | 5 | B ↓ | 15 (0.75) | 4 (0.2) | 0.08 (0.004) | | | |
| | A | 5 | A | 15 (0.75) | | | 5.2 (0.26) | | 0.24 (0.012) |
| 4 (this invention) | B | 5 | B ↓ | 15 (0.75) | 4 (0.2) | 0.08 (0.004) | | | |
| | A | 5 | A | 15 (0.75) | | | 5.2 (0.26) | 1.1 (0.055) | 0.24 (0.012) |

TABLE 17

| Run No. | pH | Moisture contents (%) | Residual nitrite(NO$_2^-$) Frying before | after | Crude fat (%) | Sorbic acid contents (%) | Color formation ability | Sensory test Color development | NPYR (ppb) | Antibotulinal effects (Preservation period) First day detected toxin | First day observed swelling |
|---|---|---|---|---|---|---|---|---|---|---|---|
| 1 | 6.23 | 38.5 | 47.2 | 10.1 | 49.2 | — | 0.360 | 0 | 15.4 | 4 | 4 |
| 2 (this invention) | 6.37 | 37.1 | 15.2 | 1.8 | 48.4 | 0.19 | 0.350 | −0.2 | 2.3 | 8 | 11 |
| 3 (this invention) | 6.26 | 39.2 | 18.5 | 1.4 | 48.8 | 0.19 | 0.320 | −0.4 | 4.2 | 11 | 12 |
| 4 (this invention) | 6.29 | 38.2 | 15.3 | 1.6 | 48.0 | 0.19 | 0.365 | 0.1 | 2.1 | 12 | 12 |

EXAMPLE 9

In this example, the antibotulinal activity, residual nitrite ($NO_2^-$) level and N-nitrosopyrrolidine content of the bacon, which was produced by injecting a suspension (A) containing sorbic acid, an organic acid and/or a reducing agent, separately from a pickle solution (B) containing a reduced amount of sodium nitrite, were examined. The processing of bacons and the products' analyses were practiced in a similar manner to Example 3.

In Run No. 1, a pickle solution (B) was injected at 10% (w/w) by weight to the pork bellies. On the other hand, in Run Nos. 2–12 according to this invention, first the solution (B) was injected at 5% (w/w) by weight to each pork belly and then the sorbic acid suspension (A) was injected at 5% (w/w) by weight to each belly. The

TABLE 18

| | Pickle solution | Aqueous suspension (A) | | |
|---|---|---|---|---|
| Run No. | (B) NaNO$_2$ (ppm) | Sorbic acid (%) | Organic acid (%) | Reductant (%) |
| 1 | 1200 (120) | | | |
| 2 (This invention) | 80 (40) | 4.0 (0.2) | | |
| 3 | 80 (40) | 2.4 (0.12) | C A | 0.96 (0.048) |
| 4 | 80 (40) | 2.4 (0.12) | GDL | 2.4 (0.12) |
| 5 | 80 (40) | 2.4 (0.12) | L A | 1.4 (0.07) |
| 6 | 80 (40) | 2.4 (0.12) | M A | 0.96 (0.048) |
| 7 | 80 | 2.4 | T A | 0.96 |

TABLE 18-continued

| | Pickle solution | Aqueous suspension (A) | | |
|---|---|---|---|---|
| Run No. | (B) NaNO$_2$ (ppm) | Sorbic acid (%) | Organic acid (%) | Reductant (%) |
| | (40) | (0.12) | (0.048) | |
| 8 | 80 | 4.0 | | Na Ery. 1.1 |
| | (40) | (0.2) | | (0.055) |
| 9 | 80 | 4.0 | | Na Asc 1.1 |
| | (40) | (0.2) | | (0.055) |
| 10 | 80 | 4.0 | | V.E. 1.1 |
| | (40) | (0.2) | | (0.055) |
| 11 | 80 | 4.0 | | As. P 1.1 |
| | (40) | (0.2) | | (0.055) |
| 12 | 80 | 4.0 | | Asc. Pa 1.1 |
| | (40) | (0.2) | | (0.055) |

C A: Citric acid,
GDL: Glucono-delta-lactone,
L A: Lactic acid,
M A: Malic acid,
T A: Tartaric acid,
Na Ery.: Sodium erythorbate,
Na Asc: Sodium ascorbate,
V.E.: Vitamin E,
As. P: Ascorbylpalmitate,
Asc. Pa: Ascorbyl palmital.

TABLE 19

| | | Residual nitrite (NO$_2^-$) (ppm) Frying | | | Antibotulinal resistance preservation period (number of days) | |
|---|---|---|---|---|---|---|
| Run No. | pH in bacon | before | after | NPYR (ppb) | First day detected toxin | First day observed swelling |
| 1 | 6.28 | 48.7 | 5.5 | 18.3 | 5 | 5 |
| 2 | 5.72 | 9.8 | ND | 4.5 | 11 | 13 |
| 3 | 5.69 | 9.7 | ND | 3.5 | 10 | 13 |
| 4 | 5.70 | 10.2 | ND | 3.8 | 10 | 13 |
| 5 | 5.72 | 9.9 | ND | 3.9 | 10 | 13 |
| 6 | 5.73 | 10.1 | ND | 4.0 | 10 | 13 |
| 7 | 5.72 | 9.9 | ND | 3.9 | 10 | 13 |
| 8 | 5.70 | 5.6 | ND | 1.1 | 12 | 13 |
| 9 | 5.71 | 5.7 | ND | 1.0 | 12 | 13 |
| 10 | 5.69 | 7.5 | ND | 0.8 | 12 | 13 |
| 11 | 5.71 | 6.2 | ND | 0.8 | 12 | 13 |
| 12 | 5.70 | 6.3 | ND | 0.8 | 12 | 13 |

ND: not detected of NPYR

EXAMPLE 10

In this example, we examined the residual nitrite (NO$_2^-$), color formation ability, preservability and the antibotulinal activity of the ham into which a sorbic acid suspension or a potassium sorbate solution (A) was injected separately from a pickle solution containing sodium nitrite.

Into approx. 1000 gr each of pork meat cut into cylinder-like shape, a pickle solution was injected. After a moderate massaging, the meats were wrapped with cotton clothes, tightly tied around with yarn, dried for 3 hours at 40° C., and smoked for 4 hours at 57° C. to provide ham products. Ten (10)% (w/w) of (B) alone was injected into the pork meat in control Run No. 1. In the groups of this invention (Run No. 2–No. 7), 5% (w/w) of (B) was injected into the pork meat, followed by the separate injection of 5% (w/w) of (A). The experimental design of each run is shown in Table 20. The sodium chloride was contained in both (A) and (B), but the polyphosphate, in (B) only, and their amounts added were 3% (w/w) and 0.3% (w/w) to the meat, respectively.

The properties of the obtained products were examined by the methods described in Example 6.

The results obtained are summarized in Table 21. From these results, we proved that the subject process injecting the sorbic acid suspension (A) separately from the addition of a reduced amount of NaNO$_2$ achieved a decrease in residual nitrite and increases in the color formation ability, preservative effectiveness and antibotulinal activity of the ham compared with the official prescription, i.e., addition of 156 ppm of sodium nitrite. Also, the ham, into which was injected separately the solution containing potassium sorbate and the pickle solution containing sodium nitrite, exhibited stronger preservative and antibotulinal effects than those of the conventional product.

TABLE 20

| | Solution (B) NaNO$_2$ | Suspension (A) | | | | |
|---|---|---|---|---|---|---|
| Run No. | (ppm) | Sorbic acid (%) | Citric acid (%) | Sodium erythorbate (%) | Lauryl monoglyceride of fatty acid (%) | Potassium sorbate (%) |
| 1 | 1560 (156) | | | | | |
| This invention | | | | | | |
| 2 | 800 (40) | 4.0 (0.2) | | | | |
| 3 | 800 (40) | 2.7 (0.135) | 0.78 (0.039) | | | |
| 4 | 800 (40) | 2.7 (0.135) | 0.78 (0.039) | 1.1 (0.055) | | |
| 5 | 800 (40) | 2.7 (0.135) | 0.78 (0.039) | | 0.24 (0.012) | |
| 6 | 800 (40) | 2.7 (0.135) | 0.78 (0.039) | 1.1 (0.055) | 0.24 (0.012) | |
| 7 | 800 (40) | | | | | 5.2 (0.26) |

TABLE 21

| | | | | | Preservation period at 27° C. (days) | | |
|---|---|---|---|---|---|---|---|
| | | | | | | Antibotulinal effect (day) | |
| Run No. | pH | Moisture contents (%) | Residual nitrite (NO$_2^-$) (ppm) | Color formation ability | First day observed putrefaction | First day detected toxin | First day observed swelling |
| 1 | 6.25 | 58.1 | 53.5 | 0.455 | 10 | 5 | 5 |
| This invention | | | | | | | |
| 2 | 5.82 | 5.92 | 10.3 | 0.497 | 25 | 13 | 14 |
| 3 | 5.80 | 58.5 | 9.8 | 0.488 | 23 | 12 | 14 |
| 4 | 5.84 | 58.3 | 5.3 | 0.510 | 23 | 15 | 18 |
| 5 | 5.82 | 58.4 | 9.5 | 0.485 | 38 | 20 | 22 |
| 6 | 5.81 | 58.0 | 4.9 | 0.508 | 39 | 20 | 24 |
| 7 | 6.24 | 58.0 | 16.3 | 0.413 | 13 | 7 | 7 |

EXAMPLE 11

In this example, we examined the effects of adding, separately from sodium nitrite, a mixture of an organic acid and sodium erythorbate to the bacon of a reduced $NaNO_2$ level, for reducing the residual nitrite ($NO_2^-$) content and N-nitrosopyrrolidine formation and increasing the antibotulinal activity in said bacon.

The method of making the bacon was the same as that described in Examples 3 and 4. In the control (Run No. 1), sodium nitrite and sodium erythorbate were incorporated in one pickle solution at the concentrations to achieve their addition by 120 ppm and 550 ppm, respectively, to the starting pork belly, by the injection of said solution into the belly by 10% (w/w). In the runs according to this invention, first a pickle solution containing $NaNO_2$ was injected into the meat at 5% so as to achieve the predetermined $NaNO_2$ concentration in the meat, and thereafter a liquid mixture of sodium erythorbate and citric acid was injected into the meat at 5% to the meat to achieve their predetermined concentrations in the meat.

The types and concentrations of the additives in the pickle solution differed for each run, but the amounts of the additives added to the meat were as follows: in the control run, sodium chloride 1.5%, sodium tripolyphosphate 0.2%, sodium nitrite, 0.012%, and sodium erythorbate, 0.055%; in the runs according to this invention, besides the above amounts of sodium chloride, sodium tripolyphosphate and sodium erythorbate, citric acid 0.10%, 0.15% or 0.2%, and sodium nitrite, 0.008%, the percentages being by weight of the meat.

The types of the additives, injecting conditions, and the concentrations of the additives in the pickle solution for each run are as shown in Table 22.

Hence, in the control run the additives' concentrations in the pickle solution were each ten times those of the target amounts of the additives to be added to the meat, and in the runs according to this invention, the concentrations in either one of the two solutions were twenty times those of the target amounts. The parenthesized figures in Table 22 denote the percentages of the amounts of named additives added to the meat, by the injection of the pickle solution A or B.

The measurements of pH, residual $NO_2^-$ content and NPYR content of the bacon were carried out by the methods described in Examples 3 and 4. The results are as shown in Table 23.

It is apparent from these results that the process by this invention makes it possible to reduce the residual nitrite ($NO_2^-$) and the N-nitrosopyrrolidine formation. Furthermore, the antibotulinal activities were examined with the sliced bacon produced in Run Nos. 1–4, which was inoculated with *C. botulinum* type A and B spores at the ratio of $10^3$ spores/g, and allowed to stand at 27° C. The antibotulinal activity in Run No. 2 and No. 3 was almost the same compared with the control Run No. 1, and in Run No. 4 it was rather superior to Run No. 1.

TABLE 22

| | Pickle solution | | | Additive concentrations added in pickle solution (%) | | | | |
|---|---|---|---|---|---|---|---|---|
| Run No. | Kinds | The amount injected into a belly (%) | Injection order | Sodium chloride | Sodium tripoly-phosphate | Sodium nitrite | Sodium erythorbate | Citric acid |
| 1 (reference) | B | 10 | — | 15(1.5) | 2(0.2) | 0.12(0.012) | 0.55(0.055) | |
| 2 (this invention) | B | 5 | B | 15(0.75) | 4(0.2) | 0.16(0.008) | | |
| | A | 5 | A | 15(0.75) | | | 1.1(0.055) | 2.0(0.10) |
| 3 (this invention) | B | 5 | B | 15(0.75) | 4(0.2) | 0.16(0.008) | | |
| | A | 5 | A | 15(0.75) | | | 1.1(0.055) | 3.0(0.15) |
| 4 (this invention) | B | 5 | B | 15(0.75) | 4(0.2) | 0.16(0.008) | | |
| | A | 5 | A | 15(0.75) | | | 1.1(0.055) | 4.0(0.20) |

TABLE 23

| Run No. | pH | Moisture contents (%) | Residual nitrite ($NO_2^-$) Before frying (ppm) | Residual nitrite ($NO_2^-$) After frying (ppm) | Crude fat contents (%) | Color formation ability | Color development (by sensory test) | NPYR (ppb) |
|---|---|---|---|---|---|---|---|---|
| 1 | 6.24 | 39.4 | 51.4 | 12.4 | 48.1 | 0.364 | 0 | 12.1 |
| 2 (this invention) | 5.95 | 38.8 | 36.4 | 8.7 | 48.4 | 0.355 | −0.2 | 8.1 |
| 3 (this invention) | 5.77 | 38.5 | 29.9 | 4.1 | 48.7 | 0.365 | 0 | 4.9 |
| 4 (this invention) | 5.64 | 37.9 | 18.1 | 3.0 | 49.1 | 0.370 | +0.1 | 3.1 |

EXAMPLE 12

In this example, we produced the bacon with Injection (A) and Injection (B) added by this invention at different points at the same time, and examined the diffusion of sodium nitrite into belly and the chemical analyses in bacon.

As the starting meat material, 4 kg of pork belly was used. Injection (A) (a suspension containing 15% sodium chloride, 2.7% sorbic acid, 0.78% citric acid and 1.1% sodium erythorbate) and Injection (B) (a pickle solution containing 15% sodium chloride, 4% polyphosphate and 800 ppm sodium nitrite) were injected at different points of a belly. We injected 5 g of each liquid at one point. The amounts of Injection (A) and Injection (B) were each 5% against the weight of the belly. The distance between the points with Injection (A) added was 30 mm, the distance between the points with Injection (B) added was 30 mm, and the distance between the point with (A) added and the point with (B) added was 21.2 mm. After injection, 1 kg of the belly was used for the examination of the diffusion of sodium nitrite into the belly held at 0° C. at lapse times (2.5, 5, 10, 30 and 60 minutes) and 3 kg of the rest was used for the production of a bacon by an ordinary process as shown in Example 3.

We examined the diffusions into belly as follows. The belly samples of I portion (0–5 mm around the injection point with Injection (B)), II portion (5–10 mm around the point) and III portion (10–15 mm around the point) were cut out by a cork borer and the amount of sodium nitrite at each portion at the lapse times was analyzed by an ordinary method. The test results on the diffusion of sodium nitrite are collectively shown in Table 24. The data prove that the amount of sodium nitrite in I portion (0–5 mm) was apparently higher than in II and III portions and was maximum 270 ppm as sodium nitrite. On the other hand, the diffusion of sodium nitrite into II and III portions was little and the values were less than 120 ppm as sodium nitrite. Therefore, by adding Injection (A) at a distance apart from I portion, the contact with a high concentration of sodium nitrite in Injection (B) and the components in Injection (A) were apparently avoided.

TABLE 24

| Lapse times (minutes) | The diffusion of sodium nitrite into belly Sodium nitrite (NaNO$_2$) analyzed (ppm) | | | | | |
|---|---|---|---|---|---|---|
| | I portion | | II portion | | III portion | |
| 2.5 | 125 | 132 | 84 | 99 | 39 | 57 |
| 5 | 166 | 92 | 81 | 85 | 52 | 46 |
| 10 | 136 | 270 | 103 | 102 | 56 | 70 |
| 30 | 101 | 159 | 75 | 74 | 61 | 58 |
| 60 | 169 | 170 | 77 | 92 | 65 | 69 |

Next, about the bacon, we conducted the chemical analyses in I portion (0–5 mm around the injection point with Injection (B)), II portion (5–10 mm around the injection point with Injection (B)), III portion (10–15 mm around the injection point with Injection (B)) and IV portion (0–5 mm around the injection point with Injection A)) cut out by a cork borer. The analyses were conducted by the ordinary method as shown in previous examples, and the diffusion of added ingredients was examined. The results are indicated in Table 25. It is clear from the results that the process by this invention makes it possible to reduce greatly the residual nitrite (NO$_2^-$), that the added sodium nitrite and acids diffused uniformly by means of the heating process and that the color formation abilities were good.

TABLE 25

| | The chemical analyses and the diffusion of injected ingredients in bacon | | | |
|---|---|---|---|---|
| Portions | pH | Sorbic acid content (%) | Residual NO$_2^-$ (ppm) | Color formation ability |
| I | 5.80 5.83 | 0.13 0.12 | 5.9 6.2 | 0.372 0.375 |
| II | 5.84 5.80 | 0.13 0.13 | 6.3 6.2 | 0.367 0.374 |
| III | 5.81 5.79 | 0.14 0.13 | 6.0 5.8 | 0.373 0.370 |

TABLE 25-continued

| | The chemical analyses and the diffusion of injected ingredients in bacon | | | |
|---|---|---|---|---|
| Portions | pH | Sorbic acid content (%) | Residual NO$_2^-$ (ppm) | Color formation ability |
| IV | 5.80 5.82 | 0.12 0.13 | 5.9 6.1 | 0.374 0.373 |

We claim:

1. A process for producing ham and bacon from pork meat in which growth of *Clostridium botulinum* and formation of nitrosamines are inhibited and in which formation of mutagens is avoided, which comprises separately adding to the meat (A) a liquid additive composition consisting essentially of at least one preservative selected from the group consisting of potassium sorbate and sorbic acid or a powdery additive composition consisting essentially of potassium sorbate and (B) a liquid or powdery nitrite curing agent, by injection, spraying, daubing or dipping for adding the liquid, or by spraying or rubbing for adding the powder, under conditions such that the nitrite does not come into contact with the preservative thus preventing the nitrite and preservative from reacting with each other thereby avoiding formation of mutagens, components (A) and (B) being added in amounts sufficient to inhibit growth of *Clostridium botulinum*.

2. The process of claim 1 in which the additive composition (A) further contains at least one member selected from the group consisting of an organic acid, an inorganic acid, an acidic organic salt and an acidic inorganic salt.

3. The process of claim 1 or 2 in which the additive composition (A) further contains a glycerol fatty acid ester having 8 to 12 carbon atoms.

4. The process of claim 3 in which the additive composition (A) is an aqueous solution, an organic solvent solution or a suspension containing a mixture of sorbic acid and potassium sorbate.

5. The process of claim 3, in which the additive composition (A) is an aqueous suspension composed of sorbic acid powder having particle diameters not greater than 100 microns, an edible surfactant and guar gum.

6. The process of claim 1 in which the additive composition (A) contains potassium sorbate.

7. The process of claim 6 in which additive composition (A) further contains a glycerol fatty acid ester having 8 to 12 carbon atoms.

8. The process of claim 1 in which the additive composition (A) further contains at least one reducing agent selected from the group consisting of ascorbic acid or its salts, erythorbic acid or its salts, higher fatty acid esters of ascorbic acid, higher fatty acid esters of erythorbic acid, higher acetals of ascorbic acid, higher acetals of erythorbic acid, and tocopherols.

9. The process of claim 8 in which the additive composition (A) contains sorbic acid and at least one of an organic acid and an acidic inorganic salt.

10. The process of claim 8 in which the additive composition (A) contains potassium sorbate.

11. The process of claim 8, 9 or 10 in which the additive composition (A) further contains a glycerol fatty acid ester having 8–12 carbon atoms.

12. The process of claim 2, 8 or 9, in which the additive composition (A) is an aqueous solution, an organic solvent solution or a suspension containing a mixture of sorbic acid and potassium sorbate.

13. The process of claim 1, 2, 8 or 9, in which the additive composition (A) is an aqueous suspension composed of sorbic acid powder having particle diameters not greater than 100 microns, an edible surfactant and quar gum.

* * * * *